(12) United States Patent
Rettmar et al.

(10) Patent No.: US 7,594,566 B2
(45) Date of Patent: Sep. 29, 2009

(54) LOCK DEVICE, TRANSMISSION/DRIVE UNIT CONTAINING SUCH A LOCK DEVICE, AND METHOD FOR MANUFACTURING SUCH A TRANSMISSION/DRIVE UNIT

(75) Inventors: Ulrich Rettmar, Buehlertal (DE); Peter Klobes, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/089,447

(22) PCT Filed: Nov. 15, 2006

(86) PCT No.: PCT/EP2006/068483

§ 371 (c)(1),
(2), (4) Date: Apr. 7, 2008

(87) PCT Pub. No.: WO2007/062981

PCT Pub. Date: Jun. 7, 2007

(65) Prior Publication Data
US 2008/0251329 A1    Oct. 16, 2008

(30) Foreign Application Priority Data
Nov. 29, 2005  (DE) ................... 10 2005 057 239
Apr. 18, 2006  (DE) ................... 10 2006 018 094

(51) Int. Cl.
*H02K 49/00* (2006.01)
(52) U.S. Cl. .................... 188/171; 310/77; 188/265
(58) Field of Classification Search ......... 188/161–164, 188/171, 265; 192/84.941; 310/77, 93
See application file for complete search history.

(56) References Cited

U.S. PATENT DOCUMENTS

| | | | | |
|---|---|---|---|---|
| 3,565,223 | A * | 2/1971 | Pierce .................... | 192/84.941 |
| 4,660,685 | A * | 4/1987 | Thacker et al. ........... | 188/73.37 |
| 4,823,926 | A * | 4/1989 | Wittler et al. ............. | 192/18 B |
| 6,155,386 | A | 12/2000 | Hirai et al. | |
| 6,202,804 | B1 * | 3/2001 | Dropmann et al. .......... | 188/171 |
| 6,209,699 | B1 * | 4/2001 | Hayashi et al. ......... | 192/84.941 |
| 6,269,917 | B1 * | 8/2001 | Harting et al. ............. | 188/161 |
| 6,909,213 | B2 * | 6/2005 | Frey et al. ..................... | 310/77 |

FOREIGN PATENT DOCUMENTS

| | | |
|---|---|---|
| DE | 297 06 124 | 6/1997 |
| EP | 1 320 175 | 6/2003 |
| FR | 2588702 | 4/1987 |
| FR | 2785656 | 5/2000 |
| GB | 2 258 702 | 2/1993 |
| JP | 4-98858 | 3/1992 |
| JP | 10-19065 | 1/1998 |

* cited by examiner

*Primary Examiner*—Christopher P Schwartz
(74) *Attorney, Agent, or Firm*—Michael J. Striker

(57) ABSTRACT

Blocking apparatus, as well as a gearbox drive unit containing such a blocking apparatus, as well as a method for production of a gearbox drive unit such as this for blocking any rotary movement of a shaft (14) with respect to a housing (16) of the gearbox drive unit (10), having a first blocking element (32) which can rotate and having a second blocking element (34) which can be moved with respect to the first blocking element (32) by means of at least one electromagnet (44) and at least one return element (42), with the blocking elements (32, 34) engaging with one another in an interlocking form in the axial direction in the blocked state, and with at least one acoustic damping element (28) being arranged axially between the interlock (85) and the electromagnet (44).

34 Claims, 4 Drawing Sheets

Figure 1:
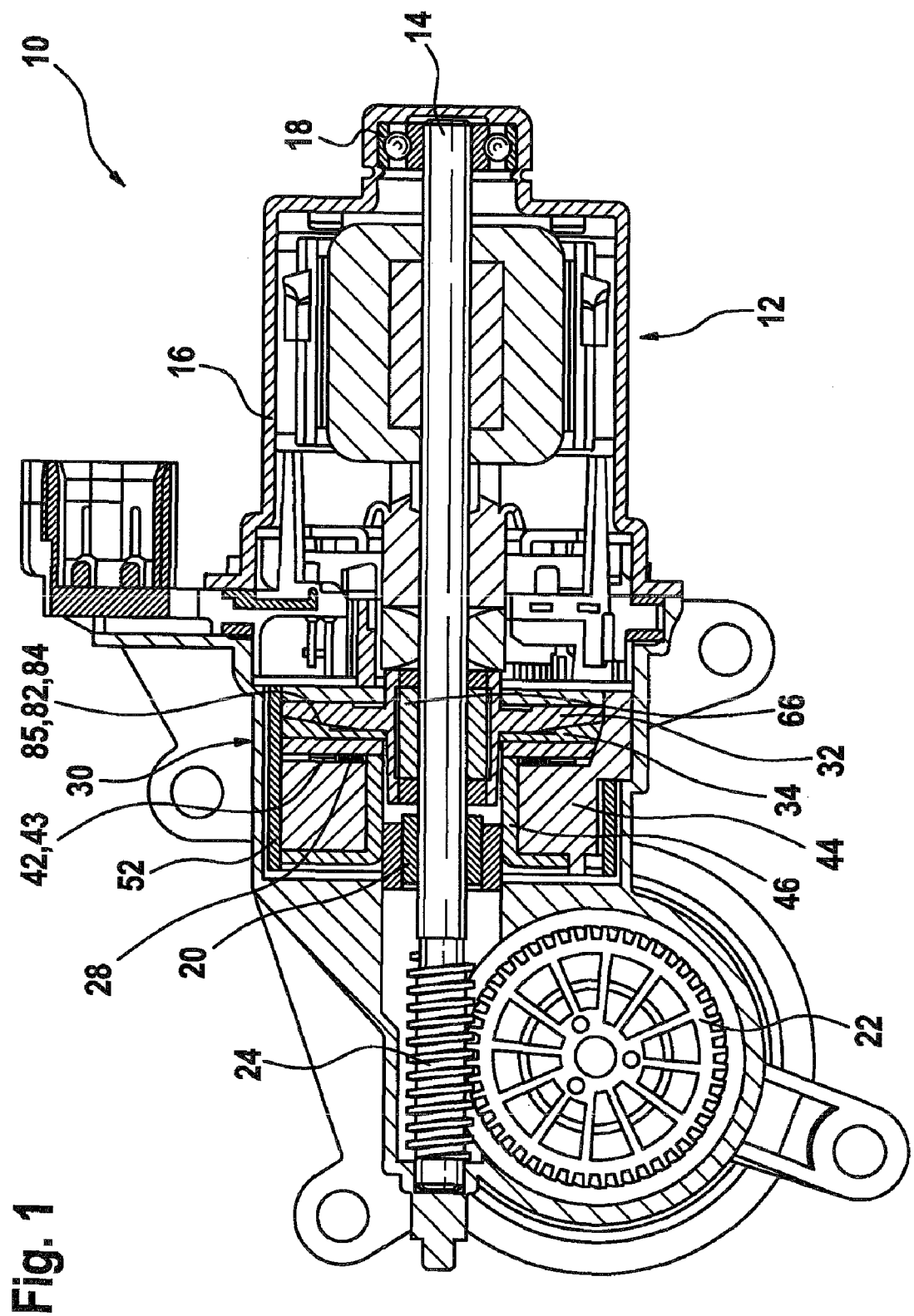

LOCK DEVICE, TRANSMISSION/DRIVE UNIT CONTAINING SUCH A LOCK DEVICE, AND METHOD FOR MANUFACTURING SUCH A TRANSMISSION/DRIVE UNIT

CROSS-REFERENCE

This is the U.S. National Stage of PCT/EP 2006/068483, filed on Nov. 15, 2006, in Europe. The invention described and claimed herein below is also described in German Patent Applications 10 2005 057239.1 and 10 2006 018094.1, filed in Germany on Nov. 29, 2005 and Apr. 18, 2006 respectively. The aforesaid German Patent Applications provide the basis for a claim of priority of invention for the invention claimed herein below under 35 U.S.C. 119(a)-(d).

BACKGROUND OF THE INVENTION

1. The Field of the Invention

The invention relates to a locking device with two locking elements situated in movable fashion in relation to each other, a transmission/drive unit containing such a locking device, and a method for manufacturing such a transmission/drive unit according to the preambles to the independent claims.

2. Description of the Related Art

EP 1 320 175 A2 has disclosed a drive- and/or braking device in which a brake unit is situated inside a housing that encloses an electric motor. The brake unit has a brake disc and a brake element that can be electromagnetically pressed against each other in a frictionally engaging fashion. The brake element here is attached to the housing of the electric motor in a rotationally and axially fixed fashion while the brake disc is situated in an axially movable fashion on the rotatably supported armature shaft of the electric motor.

A braking device embodied in this way has the disadvantage that a large number of tolerances must be compensated for during assembly of the drive unit because during the assembly, the brake element is preinstalled directly on the housing and the brake disc is preinstalled on the armature shaft and only after this are they assembled and adjusted in relation to each other. In addition, the frictional engagement between the two brake discs is very susceptible to wear and other influences such as dirt, carbon dust, grease, and abrasion phenomena, which is why in EP 1 320 175 A2, the housing of the electric motor also has to be sealed in a watertight, airtight, and dust-tight fashion. In addition, such a device produces relatively loud noise when actuated, which can be unpleasant to the occupants of a motor vehicle.

SUMMARY OF THE INVENTION

It is an object of the present invention to provide an improved locking device and an improved transmission/drive unit containing the locking device, which do not have the above-described disadvantages of the prior art devices.

The transmission/drive unit according to the present invention and the locking device situated therein as well as the method for manufacturing such a transmission/drive unit have the advantage that embodying the locking device as an independent, completely installable module significantly reduces the assembly cost for such a transmission/drive unit. In this case, it is not necessary for there to be a high degree of assembly precision of the drive element on the shaft in relation to the locking device and a high degree of positioning precision of the locking device in the housing of the transmission/drive unit. The axial tolerances (air gap) between the locking elements can be maintained at significantly less expense with the separate manufacture and independent function testing of the locking device. Due to the embodiment of an axial form-locked engagement between the two locking elements, the locking device is much less sensitive to dirt and grease, moisture, or carbon dust. The minimal wear and abrasion of the locking elements extends the longevity and long-term load capacity of the locking device. Due to the embodiment of the axial form-locked engagement between the two locking elements, for example in the form of an axial gearing (radially oriented flutes with teeth engaging in them), the locking device is also suitable for use in motor vehicles in which increased vibration- and agitation stresses occur. By contrast with the arrangement of brake discs, the present invention is not sensitive to a resonance frequency of the spring/mass system that is excited by the vibrations in the vehicle. The placement of a damping element between the electromagnet and the second locking element can effectively suppress the excitation of structure-borne noise as the lock is being released.

Advantageous modifications of the device and method according to the independent claims are possible by means of the defining characteristics disclosed in the dependent claims. If the damping element 28 is embodied in the form of a ring encompassing the shaft, then the second locking element is damped uniformly over the entire circumference upon impact with the electromagnet. It is advantageously possible for the ring to be embodied of one piece and, due to its expansion, to be simply fastened over the entire circumference.

In order to effectively suppress the structure-borne noise, in the best-case scenario, the damping element is embodied of a plastic, preferably an elastomer, which can effectively absorb the structure-borne noise over a large temperature range.

If the damping element is embodied as an O-ring or D-ring, then it can be simply pressed into a corresponding groove on the electromagnet or on the second locking element. The cross-section of the damping ring in this case can be circular, D-shaped, X-shaped, rectangular, or the like so that the axial movement of the second locking element is braked in relation to the magnet.

The electromagnet has an inner pole on which a coil element is supported, the two of which combine to form an axial end surface to which the damping element can be affixed.

Alternatively, however, it is also possible to fasten the damping element to the opposite axial surface of the second locking element.

In order to reduce an excitation of structure-borne noise during the closing of the locking device as well, at least one additional damping element is situated between the two locking elements and brakes the impact of the second locking element against the first locking element brought about by the return spring.

The axial end surface of the electromagnet can advantageously have a rounded region formed onto it, which the second locking element strikes against when the locking device is released. Through the formation of the rounded region, the second—deforming—locking element comes into contact with the electromagnet in a continuous fashion, thus significantly reducing the excitation of structure-borne noise.

It is particularly advantageous to embody the damping element out of a plastic film, in particular embodied as an adhesive film, that can be glued in a self-adhesive way to the two axial end surfaces.

In a preferred embodiment, an annular spring presses the annular damping element against the end surface of the electromagnet or of the second locking element. In this case, it is advantageous if the return spring, which is provided for the second locking element anyway, can be simultaneously used for the fixing of the damping element.

In an alternative embodiment, an elastic damping element is formed directly onto the return spring, for example by being injection molded onto it. This elastic damping element can be embodied in the form of a sheath around one or more coils of a spiral spring or in the form of a shaped part. This eliminates the need for a separate fastening process for the damping element.

If a conical spiral spring is used as the annular spring, then this assures a clean axial guidance of the second locking element without requiring additional space in the axial direction. In a particularly favorable embodiment, the spiral spring can rest against an axial offset between the inner pole and the coil element, thus fixing the spiral spring in the radial direction.

If the inner pole forms such an axial offset with the coil element, then the damping element, embodied in the form of a hat-shaped cap, can advantageously be placed over the inner pole and the coil element so that the hat-shaped cap rests radially against the axial offset.

Preferably, such a damping element is manufactured out of Teflon and optionally has an axial profile as a stop surface, which acoustically damps the stopping of the second locking element.

In an alternative embodiment, the damping element is integrated into the second locking element. To this end, preferably a composite material is used as a base component for the second locking element, which component is composed of at least one plastic layer and one metal plate. The fixed bonding of the viscoelastic plastic layer to the metal plate effectively suppresses excited structure-borne vibrations in the acoustic range.

The second locking element in this case is particularly simple to manufacture in that an axial form-locked engaging element is injection molded directly onto a baseplate made of the composite sheet and engages with the first control element.

In this case, the base part of the second locking element is simultaneously embodied as an armature plate serving as the magnetic yoke for the electromagnet. Since the composite plate has at least one or two metal plates, a second locking element of this kind equipped with an integrated damping element is also suitable for use as a magnetic armature plate.

The second locking element can be axially guided in a particularly simple fashion by having axial indentations formed into it that engage with corresponding axial guide elements of the coil support or inner pole of the electromagnet. As a result, no additional components are required since the axial guide elements and counterpart guide elements, respectively, can be integrally formed onto the electromagnet and the second locking element.

It is advantageous to operate the locking device in such a way that during the operating state, the at least one electromagnet is activated so that it pulls the second locking element axially away from the first locking element in opposition to a restoring force. As a result, the drive shaft is able to rotate unhindered during the powered state of the electromagnet. In the deactivated (unpowered) state of the electromagnet, the contact force of the return element then presses the second locking element against the first locking element in order to prevent the rotary motion in the locked state.

If the electromagnet pulls on the second locking element in the rotatable state, then this causes the locking element to rest against the damping element, which in turn rests against the electromagnet. This avoids a resonance generation of acoustic vibrations.

By forming a recess into the cylindrical wall embodied as the pole tube of the electromagnet, on the side radially opposite from the connector plug of the electromagnet, it is possible to produce a uniform axial attraction of the second locking element over the entire circumference. This prevents a tilting or jamming of the second locking element during its actuation, thus causing it to strike against the damping element with less impact, consequently reducing the generation of noise.

If the locking device according to the present invention is built into a transmission/drive unit, the first locking element rotates with the shaft; the first locking element in both axial directions on the locking device. In order to prevent a mutual contact between the two locking elements, the first rotating locking element rests against an axial side of the lock housing embodied in the form of a thrust washer. To this end, the first locking element has axial extensions that engage behind a thrust washer of the lock housing.

The method according to the invention for manufacturing a transmission/drive unit according to the invention has the advantage that because the locking device is embodied separately, it can simply be inserted into the housing together with the two locking elements and mounted on the drive shaft without strict tolerance requirements. To that end, the drive shaft is inserted into a drive element that produces a form-locked engagement with the first locking element in order to transmit torque. In a particularly suitable embodiment, the locking device is installed in the housing of the drive unit by being press-fitted into place and then being axially secured through material shaping. The axial positioning of the locking device here is not critical since the distance between the two locking elements is adjusted by means of the stops of the lock housing and drive shaft.

In order to manufacture the separately installable locking device, it is particularly suitable to assemble the two locking elements with the electromagnet, the return element, and the damping element inside a lock housing, which can then in turn be simply installed into the housing of the transmission/drive unit. The lock housing in this case absorbs the forces acting on the locking device and transmits them to the housing of the transmission/drive unit. If it is embodied, for example, as approximately closed, then the lock housing simultaneously protects the locking elements from dirt. The complete preassembly of the locking device with the two locking elements, the electromagnet, the at least one return element, and the damping element permits a supplier to independently produce this locking device, which is embodied in the form of a separate component, and test its function and power consumption. This significantly simplifies the assembly and function testing of the transmission/drive unit.

DRAWINGS

Various exemplary embodiments of a locking device according to the invention and of a transmission/drive unit are shown in the drawings and explained in detail in the description that follows.

Figure 2:
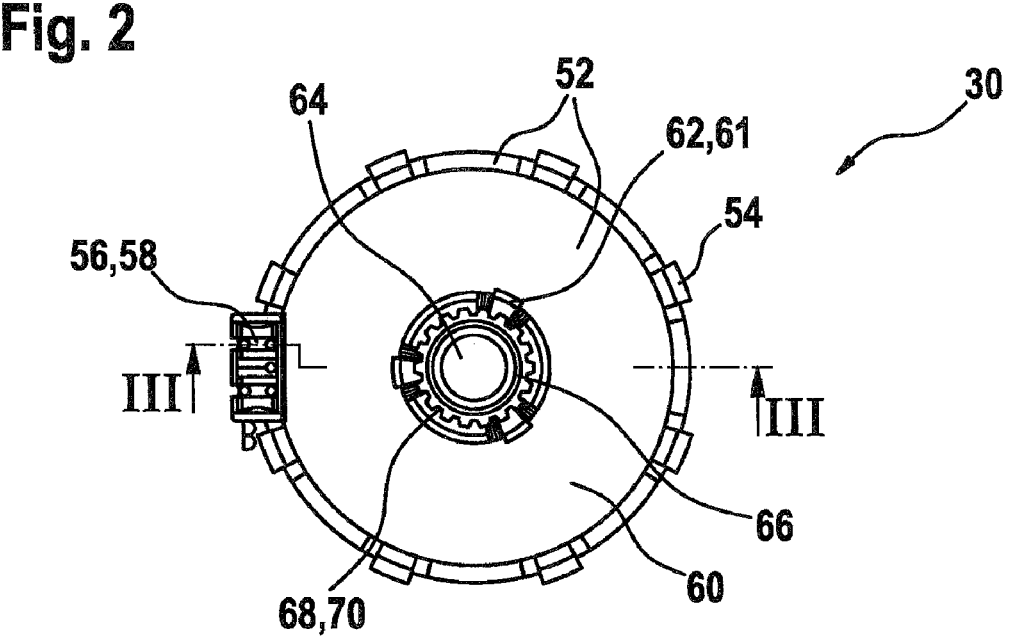
Figure 3:
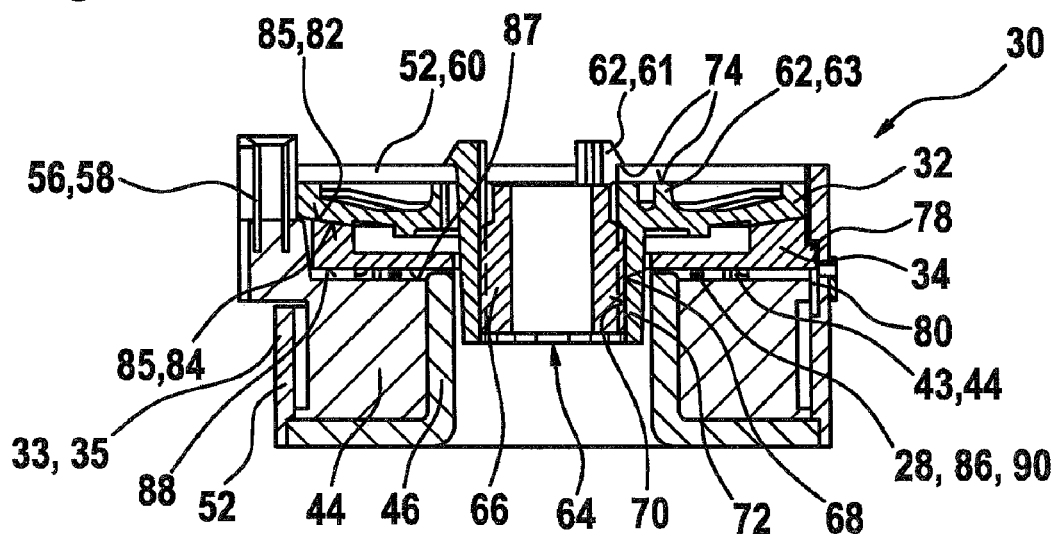
Figure 4:
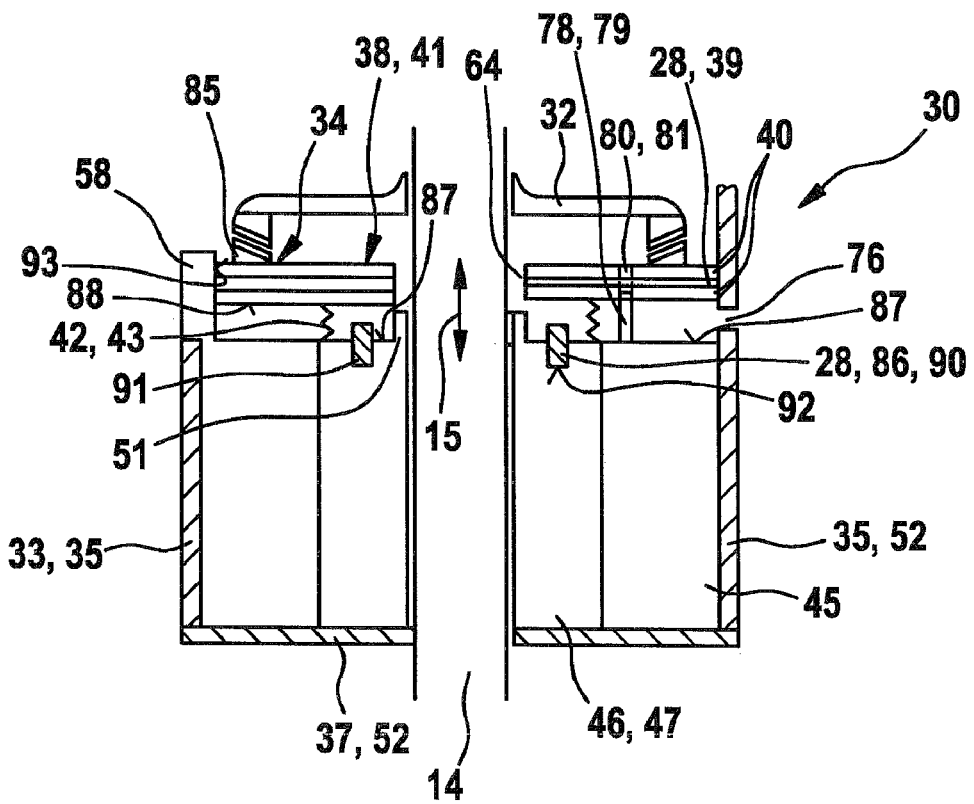
Figure 5:
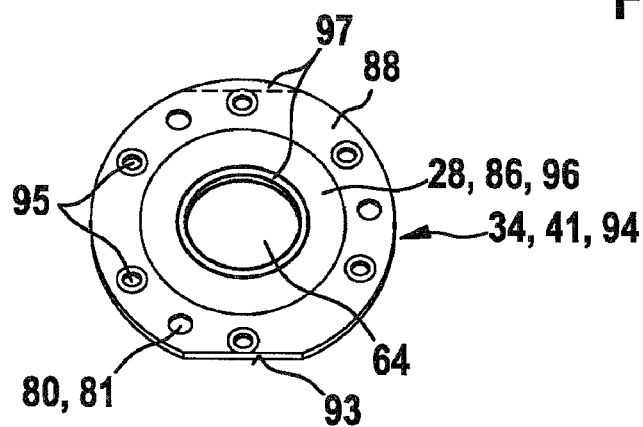
Figure 6:
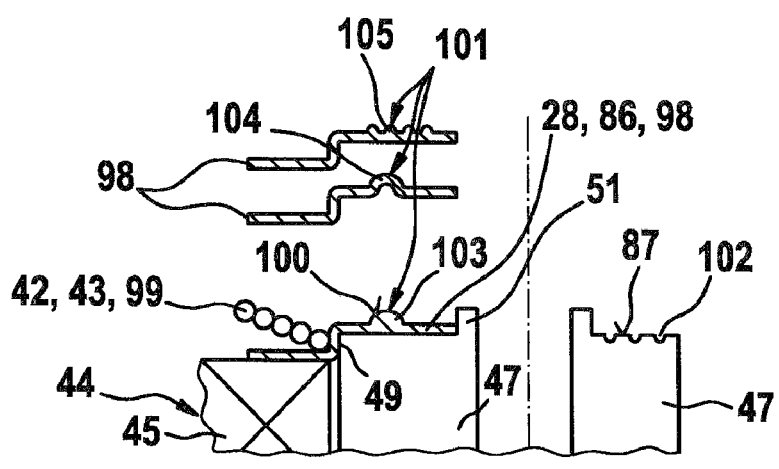
Figure 7:
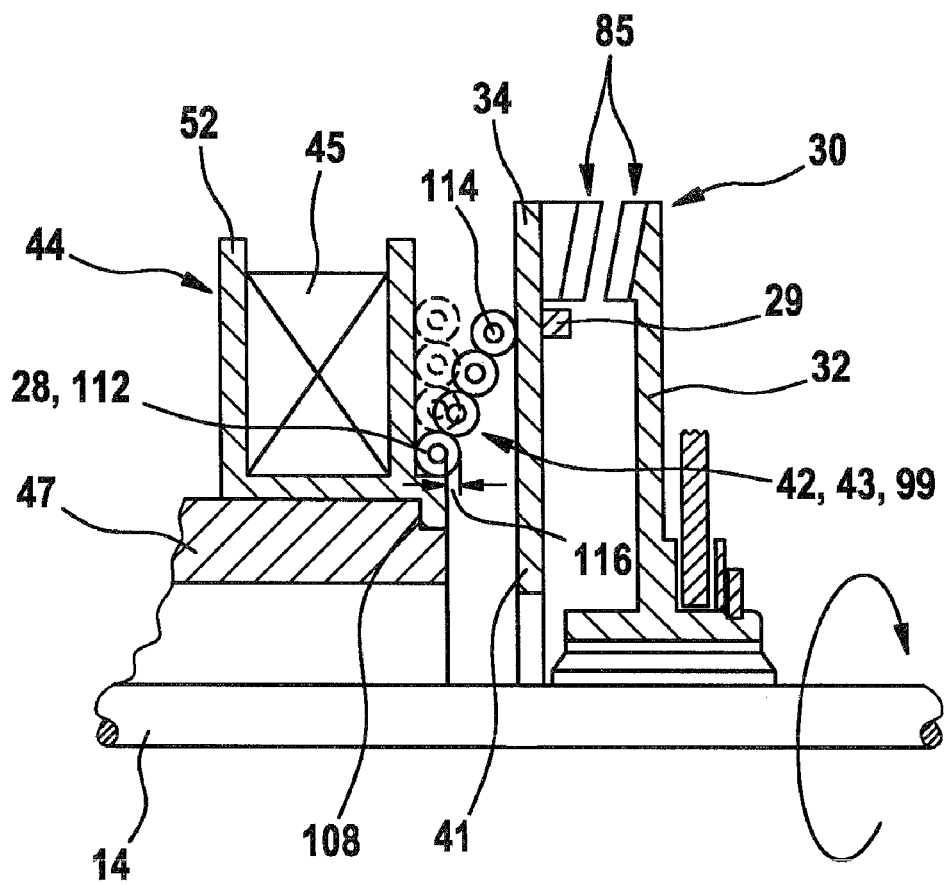
Figure 8:
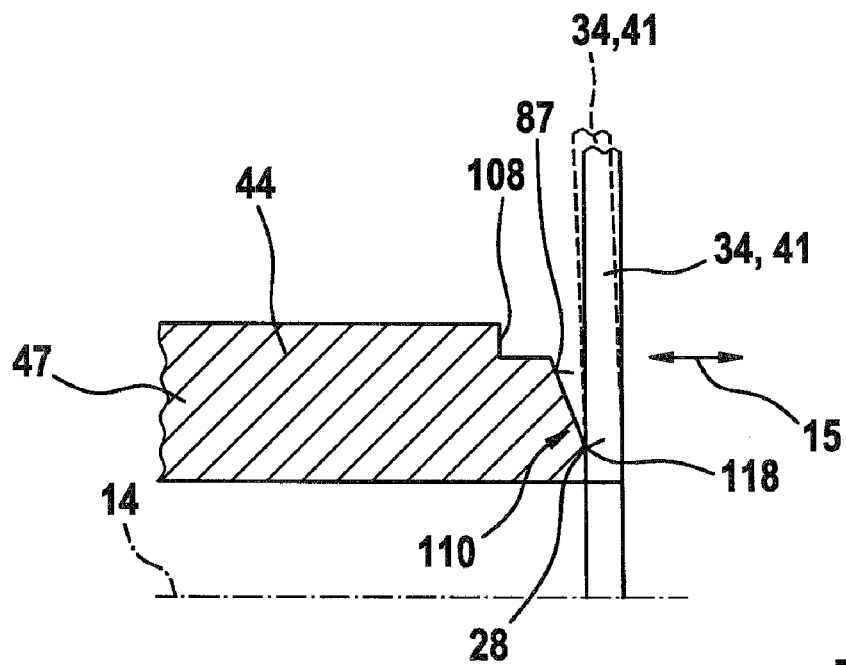

FIG. 1 shows a section through a locking device according to the invention, installed in a transmission/drive unit, FIG. 2 is an axial view of the locking device from FIG. 1, FIG. 3 shows a section through the locking device from FIG. 2 along the line III-III, FIG. 4 shows a section through another exemplary embodiment of a locking device, FIG. 5 shows another variation of the second locking element according to FIG. 4, FIG. 6 shows other damping elements according to the invention, FIG. 7 shows another variation of a locking device, and FIG. 8 shows another damping element according to the invention.

DESCRIPTION OF THE EXEMPLARY EMBODIMENTS

FIG. 1 shows a transmission/drive unit 10 in which an electric motor 12 with a drive shaft 14 is situated inside a housing 16 of the transmission/drive unit 10. The drive shaft 14 is supported by means of a roller bearing 18 and/or a slide bearing 20 and has a worm 24 that cooperates, for example by means of a worm gear 22, with an actuating element, not shown, of a moving part in the motor vehicle. In order to lock the drive shaft 14 in relation to the housing 16, a locking device 30 composed of a first locking element 32 and second locking element 34 is situated inside the housing 16. The first locking element 32 engages in a form-locked fashion with a drive element 66 that is supported in a rotationally fixed fashion on the drive shaft 14. By contrast, the second locking element 34 is attached in a rotationally fixed fashion to the housing 16. In the locked state (as shown in FIG. 1), the first locking element 32 engages in a form-locked fashion with the second locking element 34, thus preventing a rotation of the drive shaft 14. To this end, the two locking elements 32, 34 have radially extending flutes 82 and protrusions 84 that produce an axially form-locked engagement 85 and are pressed into engagement with one another in accordance with an axial gearing 85 by means of at least one resilient return element 42. In the exemplary embodiment, the surfaces of the locking elements 32, 34 that engage each other in a form-locked manner are situated at an angle of less than 90° and greater than 90°, respectively, in relation to the shaft 14. The second locking element 34 is operatively connected to an electromagnet 44, which, in the powered state, pulls the second locking element 34 axially away from the first locking element 32 in opposition to the spring force of the return element 42 in such a way that the axial form-locked engagement 85 is released and the two locking elements 32 and 34 can rotate in relation to each other without touching each other. The electromagnet 44 is supported in a coil support 46 that on the one hand, is attached to the housing 16 in a rotationally fixed fashion and on the other hand, has axial guide elements 78 that cooperate with corresponding axial counterpart guide elements 80 of the second locking element 34. This assures that when a current is applied to the electromagnet 44, the locking device 30 is in the rotatable state, whereas the unpowered state corresponds to the locked state. In this instance, the locking device 30 is a separate, preassembled component 31 that includes at least the two locking elements 32, 34 and the electromagnet 44. In FIG. 1, these components are situated in a lock housing 52 of the locking device 30; the lock housing 52 is press-fitted axially into the housing 16 and is prevented from shifting. Between the second locking element 34 and electromagnet 44, at least one damping element 28 is provided, which prevents the generation of unpleasant noise when the second locking element 34 strikes against electromagnet 44.

FIG. 2 shows a view of the separately embodied locking device 30 in the axial direction before it is installed into the transmission/drive unit 10. The two locking elements 32, 34 and the electromagnet 44 are situated in the lock housing 52. The lock housing 52 is cylindrically embodied and on its circumference has detent elements 54 that dig into the housing 16 when inserted into it. On the circumference of the lock housing 52, a plug element 58, which can be supplied with current independently of the motor current of the electric motor 12, is provided as an electrical contacting point 56 of the electromagnet 44. The end surface of the lock housing 52 is embodied as a thrust washer 60 against which the first locking element 32 is axially supported by means of axial extensions 62. The first locking element 32 is embodied as a disk with a central opening 64, which engages in a form-locked fashion with a drive element 66. In the exemplary embodiment, the form-locked connection is composed of an internal gearing 68 of the first locking element 32, which is slid axially onto an external gearing 70 of the drive element 66. During assembly of the transmission/drive unit 10 in this case, the drive element 66 is first attached to the drive shaft 14 in a rotationally fixed fashion and then the drive shaft 14 with the drive element 66 is inserted axially into the opening 64 of the locking device 30. Since the first locking element 32 is supported axially inside the lock housing 52, the axial positioning of the drive shaft 14 is not tolerance-sensitive to the locking device 30.

FIG. 3 shows a section through the locking device 30 from FIG. 2 along the line III-III; for the sake of illustration, the drive element 66 is depicted without the drive shaft 14, in form-locked engagement with the first locking element 32. At its central opening 64, the first locking element 32 has a sleeve 72 onto which the internal gearing 68 is formed. For axial support in relation to the inner wall of the thrust washer 60, the locking element 32 has an axial extension 62 in the form of a circumferential rib 63, which rests against the rotationally fixed stop 74 formed by the inner wall of the thrust washer 60. For support in relation to the electromagnet 44, the first locking element 32 has additional axial extensions 62 that are embodied in the form of detent hooks 61, which reach through the central opening 64 of the thrust washer 60 and rest against the outer wall of the thrust washer 60 that constitutes an additional stop 74. The detent hooks 61 are cut out from the sleeve 72 so that they can be flexibly inserted through the opening 64 and then snap securely into place. In this way, the first locking element 32 is reliably secured against axial movement inside the lock housing 52 in a simple fashion. In an alternative embodiment that is not shown, the axial extensions 62 rest against the outside of the thrust washer 60 by means of a material shaping or the axial extensions 62 are embodied in the form of a dome that is supported against the thrust washer 60 by means of a clamping ring. The electromagnet 44 is situated on the coil support 46 that simultaneously constitutes part of the lock housing 52. The second locking element 34 is situated in a rotationally fixed fashion in the lock housing 52 by means of axial guide elements 78; the guide elements 78 cooperate with corresponding counterpart elements 80 of the lock housing 52. In the locked state, the return element 42 presses the second locking element 34, which is embodied in the form of a disk, into a form-locked engagement with the first locking element 32. If the electromagnet 44 is supplied with current, then the magnetic force pulls the locking element 34 downward in FIG. 3, as a result of which the form-locked engagement 85 of the locked state is released and the first locking element 32 is able to rotate frictionlessly in relation to the second locking element 34. The return element 42 is composed, for example, of several spring elements 43 or is embodied in the form of a uniform spring element 43 that encompasses the central opening 64. The damping element 28 is embodied in the form of a damping ring 86 made of plastic, in particular an elastomer, which in the installed state, encloses the drive shaft 14. The damping ring 86 in this case is fastened to the axial surface 88 of the second locking element 34 oriented toward the electromagnet 44 or is fastened directly to the electromagnet 44. To embody an axial form-locked engagement 85 in the locked state, the locking elements 32 and 34 each have radially extending recesses 82 and raised regions 84 that are embodied, for example, in the form of axial gearing 85.

FIG. 4 shows another exemplary embodiment of a locking device 30. The coil support 46 of the electromagnet 44 is embodied in the form of an inner pole 47 on which the coil element 45 is situated. The lock housing 52 has a cylindrical wall 35 that is attached, for example, to a separately embodied bottom surface 37 of the lock housing 52, in particular by being swaged onto it. The inner pole 47, together with the bottom surface 37, the cylindrical wall 35, and the second locking element serving as an armature plate 41, constitutes a magnetic yoke for the coil element 45 of the electromagnet 44. The second locking element 34 in this exemplary embodiment is composed of a structure-borne noise-damping composite plate 38 in which a plastic layer 39 is embedded between two metal plates 40. The plastic layer 39 has a thickness of 0.01-0.1 mm, for example, and is composed of a viscoelastic material that is adapted to the specific geometry of the locking device 30 for vibration-damping purposes. As a result, the composite plate 38 with the plastic layer 39 represents a damping element 28 that is integrated into the second locking element 34. The axial form-locked engagement/gearing 85 in this case is formed onto the composite plate 38, for example is injection-molded out of plastic that is formed directly onto the plate. The metal plates 40 have a thickness of 0.1-2.0 mm, for example, and are preferably composed of plate steel. In an alternative embodiment that is not shown here, the composite plate 38 has only a single metal plate 40 and a single plastic disk 39. In addition to the damping element 28 integrated into the second locking element 34, the locking device 30 has another damping element 28 that is embodied as a damping ring 90 that damps in the axial direction. For example, the damping ring 90 has a rectangular cross section 91 and is fastened in a corresponding groove 92 of the metal inner pole 47. FIG. 4 shows a state in which, with the electromagnet 44 powered, the locking element 34 has just disengaged from the form-locked engagement 82, 84, but has not yet come to rest against the damping ring 90 of the inner pole 47. The second locking element 34 is guided by the axial guides 78, which are formed onto the coil element 45 in the form of guide pins 79 and engage in corresponding counterpart guide elements 80 in the form of axial holes 81 that are formed into the second locking element 34. The return element 42, which is embodied in the form of an annular spring element 43 that encompasses the drive shaft 14, serves to reset the second locking element 34 in order to lock the transmission. As in FIG. 3, the coil element 45 has a plug element 58 that axially engages in a corresponding cut-out 93 of the second locking element 34. In order to balance the magnetic flux, the cylinder wall 35 functioning as a pole tube of the electromagnet 44 has a recess 76 that is intended to compensate for the missing wall material of the cylinder wall 35 and/or of the second locking element 34 embodied in the form of an armature plate 41, in the region of the plug 58.

FIG. 5 shows a disk-shaped base part 94 of the second locking element 34 in accordance with the embodiment from FIG. 4. The base part 94 is embodied in the form of the composite plate 38 on which corresponding recesses 95 are provided for the molding-on of the axial form-locked engagement 85. In addition, three holes 81 are visible, which serve as counterpart guide elements 80 for corresponding guide pins 79. In this embodiment, an annular plastic film 96 is fastened as a damping element 28 onto the axial surface 88 of the second locking element 34. The plastic film 96 is embodied, for example, as an adhesive film that adheres to the axial surface 88 in a self-adhesive fashion and when pulled toward the electromagnet 44, comes to rest against it. Such a damping element 28 embodied in the form of a plastic film 96 is likewise suitable for combination with a composite plate 38 in which another damping element 28 is situated inside the base part 94 of the second locking element 34. For the magnetic compensation or weight compensation of the cut-out 93 of the second locking element 34, it is optionally possible for corresponding sections 97 to be cut out from the locking element 34—in particular on the radially opposite side.

FIG. 6 shows another exemplary embodiment of a damping element 28, which is embodied in the form of a hat-shaped cap 98 that rests against the electromagnet 44. In relation to the coil element 45, the inner pole 47 forms an axial offset 49 against which the hat-shaped cap 98 rests in the radial direction. Oriented toward the drive shaft 14, the inner pole 47 has an additional axial extension 51; the hat-shaped cap 98 extends in the radial direction all the way to this axial extension. The extension 51 optionally also serves to axially guide and center of the second locking element 34. An annular spring element 43 presses the cap 98 axially against the electromagnet 44; the spring element 43 is simultaneously embodied as a return element 42 of the second locking element 34. The spring element 43 is embodied in the form of a conical spiral spring 99 that in particular rests against the cap 98 in the region of the axial offset 49. As a stop surface 100 for the axial surface 88 of the second locking element 34, the hat-shaped cap 98 has a corresponding profiling 101 that can be embodied in several variations according to FIG. 6 in order to satisfy various damping requirements. For example, the profiling 101 here has a bead 103, an axial curvature 104, or several ribs 105. The cap 98 in the exemplary embodiment is made of Teflon, but can as needed also be made of another noise-damping material, e.g. HNBR. For improved contact of the hat-shaped damping element 98, the axial side 87 of the electromagnet 44 is provided with a structuring 102 (in particular flutes or bombardment) formed onto it, which should increase the action of the damping element 28.

FIG. 7 shows another embodiment of a locking device 30 in an intermediate position in which the damping element 28 is formed directly onto the return element 42. The return element 42 is embodied in the form of a spiral spring 99 with a plurality of coils 114 that are pressed against the electromagnet 44 by the second locking element 34 when the electromagnet 44 is switched on (depicted with dashed lines). In the example, the damping element 28 is embodied in the form of an elastic sheath 112 around at least one coil 114 so that when the locking device 30 is open, both the second locking element 34 and the electromagnet 44 rest against the elastic sheath 112—for example an extrusion coating with elastomer, which therefore damps the impact. In order to precisely adjust the braking path predetermined by the thickness 116 of the damping element 28, the coil element 45 is situated against a collar 108 of the inner pole 47 so that the tolerances for the braking path are kept to a minimum. Between the first and second locking element 32, 34, an additional damping element 29 is provided, which damps the impact of the second locking element 34 against the first locking element 32 during the closing of the lock. In the process of this, the damping element 29 that is fastened to the first or second locking element 32, 34 comes to rest against the opposing locking element 32, 34 before the form-locked engagement 85 is completely achieved. Like the first damping element 28, the additional damping element 29 can be fastened by various means, for example by being glued, clipped, or molded-on.

FIG. 8 shows another locking element 30 in which the damping element 28 is embodied as a radius 110 formed onto the electromagnet 44. The radius 110 is formed onto the axial end surface 87 of the inner pole 47, for example, so that during the opening of the lock, the second locking element 34 initially rests with a relatively small radially inner region 118 against the radius 110 and is then the elastically deformed in the axial direction 15 (depicted with dashed lines) and comes to rest against the electromagnet 44, following along the radius 110. This brakes the axial impact of the second locking element 34, thus suppressing the excitation of structure-borne noise.

It should be noted with regard to the exemplary embodiments shown in the figures and disclosed in the description that there are a multitude of possible combinations of the individual defining characteristics with one another. It is thus possible, for example, to vary the specific embodiment of the form-locked engagement 85 between the first and second locking elements 32, 34 and the specific embodiment of the damping element 28 and spring element 43 and to adapt them to the requirements, in particular with regard to vibration-, agitation-, and noise loads. Preferably, the transmission/drive unit 10 according to the invention is used to actuate a differential transmission of a vehicle that is subjected, for example, to an agitation load of 20 g. The locking device 30 according to the invention can, however, also be used for other electric motors 12 such as actuator drive units, which are subjected to a high temperature- and vibration load.

What is claimed is:

1. A locking device (30) for preventing a rotating motion of a shaft (14) in relation to a housing (16) of a transmission/drive unit (10), said locking device (30) comprising
   a first locking element (32);
   a second locking element (34) that is movable in relation to the first locking element (32) by an electromagnet (44) and at least one return element (42) so that in a locked state the locking elements (32, 34) engage with each other in an axial direction (15) by means of a form-locking engagement (85);
   at least one acoustic damping element (28) axially situated between the electromagnet (44) and the form-locking engagement (85); and
   an additional acoustic damping element (29) axially situated between the first locking element (32) and the second locking element (34) to reduce noise generation as the locking elements (32, 34) engage with each other in said form-locking engagement (85).

2. The locking device (30) as recited in claim 1, wherein said at least one acoustic damping element (28) comprises a damping ring (90) that damps in the axial direction (15), said damping ring (90) has a circular, D-shaped, rectangular or X-shaped cross section, and said damping ring (90) is situated in a groove (92) located on an axial side (87) of the electromagnet (44).

3. The locking device (30) as recited in claim 1, wherein said at least one return element (42) comprises an annular spring (43).

4. The locking device (30) as recited in claim 3, wherein said annular spring (43) is a conical spiral spring (99) that encompasses the shaft (14).

5. The locking device (30) as recited in claim 1, wherein said at least one acoustic damping element (28) is made of plastic and has an axial profiling (101) that provides a contact surface (100) for the second locking element (34).

6. The locking device (30) as recited in claim 1, wherein said at least one acoustic damping element (28) comprises a composite plate (38) integrated into the second locking element (34) and wherein said composite plate (38) comprises a viscoelastic plastic layer (39) and at least one metal plate (40).

7. The locking device (30) as recited in claim 6, wherein the second locking element (34) comprises a base plate (94) embodied as the composite plate (38), onto which an axial gearing (82, 84) is injection-molded to provide said form-locking engagement (85) for form-locking said second locking element (34) with said first locking element (32).

8. The locking device (30) as recited in claim 1, wherein the second locking element (34) is provided with axial holes (81) and the electromagnet (44) has axial guide pins (79) formed on an axial side (87) of the electromagnet (44) and arranged to engage in the axial holes (81) of the second locking element (34) in order to axially guide the second locking element (34).

9. A locking device (30) for preventing a rotating motion of a shaft (14) in relation to a housing (16) of a transmission/drive unit (10), said locking device (30) comprising
   a first locking element (32);
   a second locking element (34) that is movable in relation to the first locking element (32) by an electromagnet (44) and at least one return element (42) so that in a locked state the locking elements (32, 34) engage with each other in an axial direction (15) by means of a form-locking engagement (85); and
   at least one acoustic damping element (28) axially situated between the electromagnet (44) and the form-locking engagement (85);
   wherein said at least one acoustic damping element (28) is fixed by said at least one return element (42) to an axial side (87) of the electromagnet (44) or to the second locking element (34); and
   wherein said at least one return element (42) is an annular spring (43).

10. The locking device (30) as recited in claim 9, wherein said annular spring (43) is a conical spiral spring (99) that encompasses the shaft (14).

11. The locking device (30) as recited in claim 9, wherein said at least one acoustic damping element (28) comprises a damping ring (90) that damps in the axial direction (15), said damping ring (90) has a circular, D-shaped, rectangular or X-shaped cross section, and said damping ring (90) is situated in a groove (92) located on said axial side (87) of the electromagnet (44).

12. The locking device (30) as recited in claim 9, wherein said at least one acoustic damping element (28) is made of plastic and has an axial profiling (101) that provides a contact surface (100) for the second locking element (34).

13. The locking device (30) as recited in claim 9, wherein said at least one acoustic damping element (28) comprises a composite plate (38) integrated into the second locking element (34) and wherein said composite plate (38) comprises a viscoelastic plastic layer (39) and at least one metal plate (40).

14. The locking device (30) as recited in claim 13, wherein the second locking element (34) comprises a base plate (94) embodied as the composite plate (38), onto which an axial gearing (82, 84) is injection-molded to provide said form-locking engagement (85) for form-locking said second locking element (34) with said first locking element (32).

15. The locking device (30) as recited in claim 9, wherein the second locking element (34) is provided with axial holes (81) and the electromagnet (44) has axial guide pins (79) formed on said axial side (87) of the electromagnet (44) and arranged to engage in the axial holes (81) of the second locking element (34) in order to axially guide the second locking element (34).

16. A locking device (30) for preventing a rotating motion of a shaft (14) in relation to a housing (16) of a transmission/drive unit (10), said locking device (30) comprising
   a first locking element (32);
   a second locking element (34) that is movable in relation to the first locking element (32) by an electromagnet (44) and at least one return element (42) so that in a locked state the locking elements (32, 34) engage with each other in an axial direction (15) by means of a form-locking engagement (85); and at least one acoustic damping element (28) axially situated between the electromagnet (44) and the form-locking engagement (85);

wherein said at least one return element (42) comprises an annular spring (43) and said at least one acoustic damping element (28) comprises an elastic sheath (112) on said annular spring (43).

17. The locking device (30) as recited in claim 16, wherein said annular spring (43) is a conical spiral spring (99) that encompasses the shaft (14).

18. The locking device (30) as recited in claim 16, wherein said at least one acoustic damping element (28) comprises a damping ring (90) that damps in the axial direction (15), said damping ring (90) has a circular, D-shaped, rectangular or X-shaped cross section, and said damping ring (90) is situated in a groove (92) located on an axial side (87) of the electromagnet (44).

19. The locking device (30) as recited in claim 16, wherein said at least one acoustic damping element (28) comprises a plastic material and has an axial profiling (101) that provides a contact surface (100) for the second locking element (34).

20. The locking device (30) as recited in claim 16, wherein said at least one acoustic damping element (28) comprises a composite plate (38) integrated into the second locking element (34) and wherein said composite plate (38) comprises a viscoelastic plastic layer (39) and at least one metal plate (40).

21. The locking device (30) as recited in claim 20, wherein the second locking element (34) comprises a base plate (94) embodied as the composite plate (38), onto which an axial gearing (82, 84) is injection-molded to provide said form-locking engagement (85) for form-locking said second locking element (34) with said first locking element (32).

22. The locking device (30) as recited in claim 16, wherein the second locking element (34) is provided with axial holes (81) and the electromagnet (44) has axial guide pins (79) formed on an axial side (87) of the electromagnet (44) and arranged to engage in the axial holes (81) of the second locking element (34) in order to axially guide the second locking element (34).

23. A locking device (30) for preventing a rotating motion of a shaft (14) in relation to a housing (16) of a transmission/drive unit (10), said locking device (30) comprising
a first locking element (32);
a second locking element (34) that is movable in relation to the first locking element (32) by an electromagnet (44) and at least one return element (42) so that in a locked state the locking elements (32, 34) engage with each other in an axial direction (15) by means of a form-locking engagement (85);
at least one acoustic damping element (28) axially situated between the electromagnet (44) and the form-locking engagement (85); and
a lock housing (52) that has a cylinder wall (35) and a plug (58) on one side of the cylinder wall (35);
wherein said cylinder wall (35) is embodied as a pole tube (33) of the electromagnet (44) and is provided with a radial recess (76) on another side of the cylinder wall (35) that is opposite said one side to compensate for missing magnetic flux in the vicinity of the plug (58).

24. The locking device (30) as recited in claim 23, wherein said at least one return element (42) comprises an annular spring (43).

25. The locking device (30) as recited in claim 24, wherein said annular spring (43) is a conical spiral spring (99) that encompasses the shaft (14).

26. The locking device (30) as recited in claim 23, wherein said at least one acoustic damping element (28) comprises a damping ring (90) that damps in the axial direction (15), said damping ring (90) has a circular, D-shaped, rectangular or X-shaped cross section, and said damping ring (90) is situated in a groove (92) located on an axial side (87) of the electromagnet (44).

27. The locking device (30) as recited in claim 23, wherein said at least one acoustic damping element (28) is made of plastic and has an axial profiling (101) that provides a contact surface (100) for the second locking element (34).

28. The locking device (30) as recited in claim 23, wherein said at least one acoustic damping element (28) comprises a composite plate (38) integrated into the second locking element (34) and wherein said composite plate (38) comprises a viscoelastic plastic layer (39) and at least one metal plate (40).

29. The locking device (30) as recited in claim 28, wherein the second locking element (34) comprises a base plate (94) embodied as the composite plate (38), onto which an axial gearing (82, 84) is injection-molded to provide said form-locking engagement (85) for form-locking said second locking element (34) with said first locking element (32).

30. A transmission/drive unit (10) comprising a housing (16), a drive shaft (14) supported in the housing (16) and a locking device (30) according to claim 29, in which the first locking element (32) is rotatable in relation to the housing (16).

31. The locking device (30) as recited in claim 23, wherein the second locking element (34) is provided with axial holes (81) and the electromagnet (44) has axial guide pins (79) formed on an axial side (87) of the electromagnet (44) and arranged to engage in the axial holes (81) of the second locking element (34) in order to axially guide the second locking element (34).

32. The locking device (30) as recited in claim 23, wherein said lock housing (52) has a thrust washer (60) and the first locking element (32) rests axially against said thrust washer (60) of the lock housing (52).

33. A method of manufacturing a transmission/drive unit (10), wherein said transmission/drive unit comprises a housing (16), a drive shaft (14) supported in the housing (16) and a locking device (30);
wherein the locking device (30) comprises a first locking element (32), a second locking element (34) that is movable in relation to the first locking element (32) by an electromagnet (44) and at least one return element (42) so that in a locked state the locking elements (32, 34) engage with each other in an axial direction (15) by means of a form-locking engagement (85), at least one acoustic damping element (28) axially situated between the electromagnet (44) and the form-locking engagement (85), and a lock housing (52) that has a cylinder wall (35) and a plug (58) on one side of the cylinder wall, said cylinder wall (35) being embodied as a pole tube (33) of the electromagnet (44) and being provided with a radial recess (76) on another side of the cylinder wall (35) that is opposite from said one side to compensate for missing magnetic flux in the vicinity of the plug (58);
wherein said method comprises the steps of:
a) attaching the locking device (30) to the housing (16) of the transmission/drive unit (10); and then
b) inserting the shaft (14) together with a drive element (66) in a central recess (64) provided in the first locking element (32) in a play-encumbered form-locked engagement.

34. The method as recited in claim 33, further comprising testing the locking device (30) as a separate unit enclosed by the lock housing (52) prior to attaching the locking device (30) in the housing (16) and placing the at least one acoustic damping element (28) in the lock housing (52) with the locking elements (32, 34) prior to the testing.

* * * * *